Oct. 7, 1958
U. BAUDER ET AL
2,854,899
APPARATUS FOR MANUFACTURING HEAT-SEALED
FLAT BAGS AND FOR PULLING SUCH BAGS
OVER MANDRELS OF SQUARE SECTION
Filed April 16, 1956
6 Sheets-Sheet 1
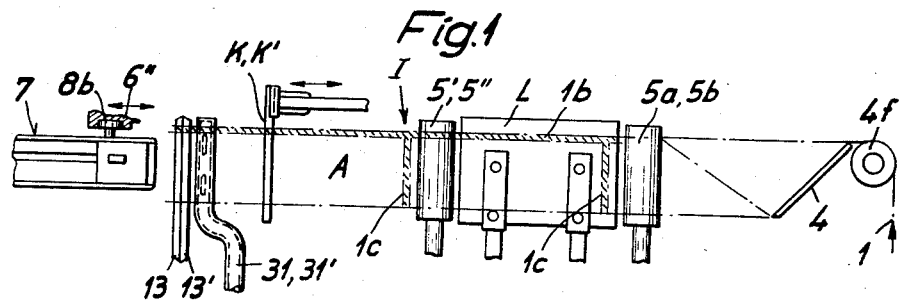
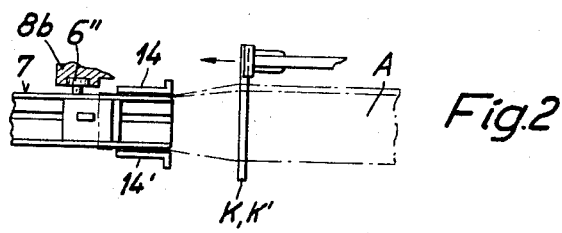
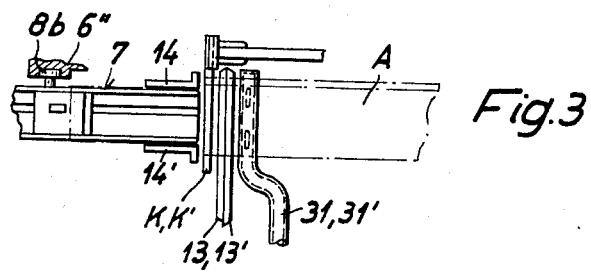
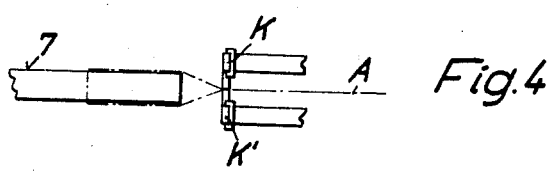
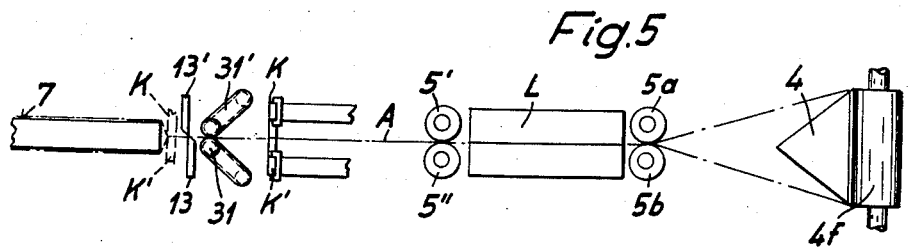
Ulrich Bauder and
Maximilian Hornsteiner,
Inventors
By Richardson, David & Morton
Their Attorneys

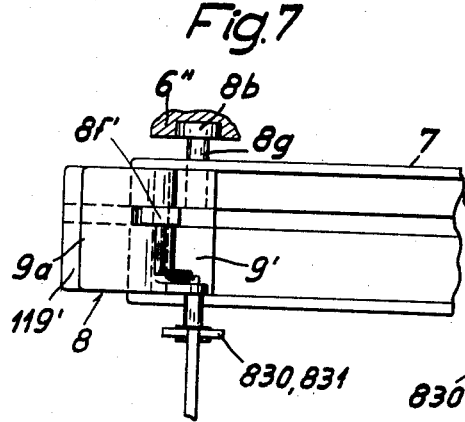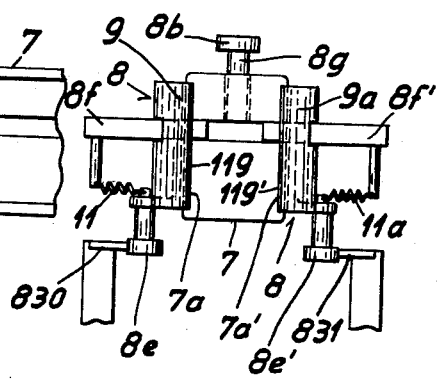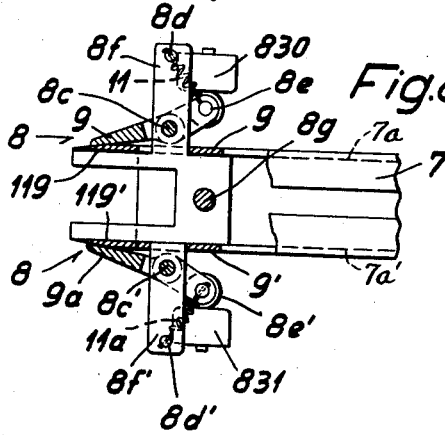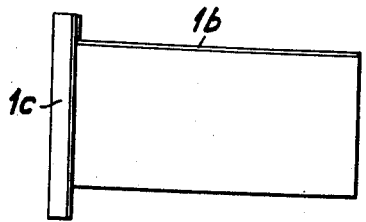

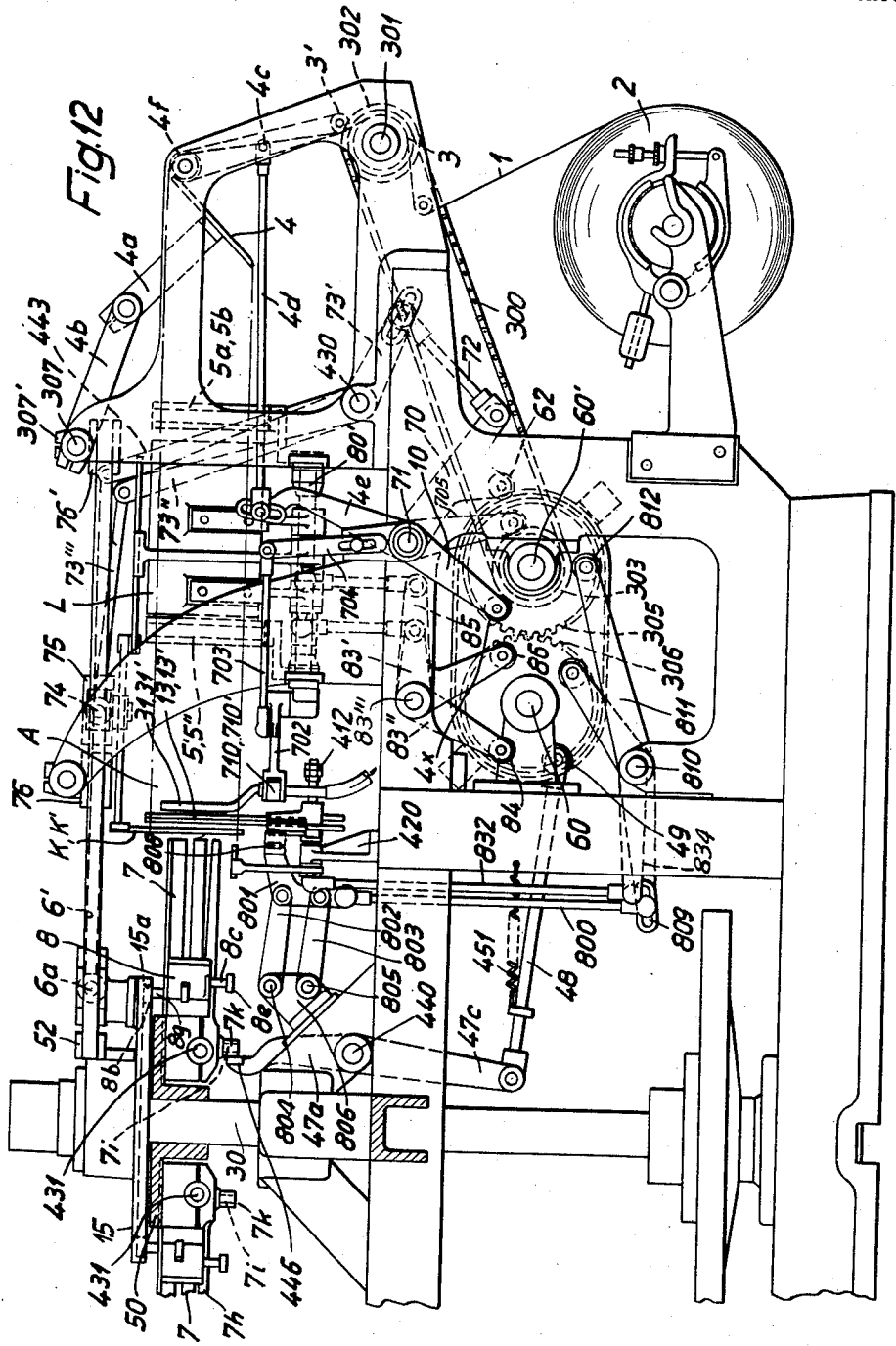

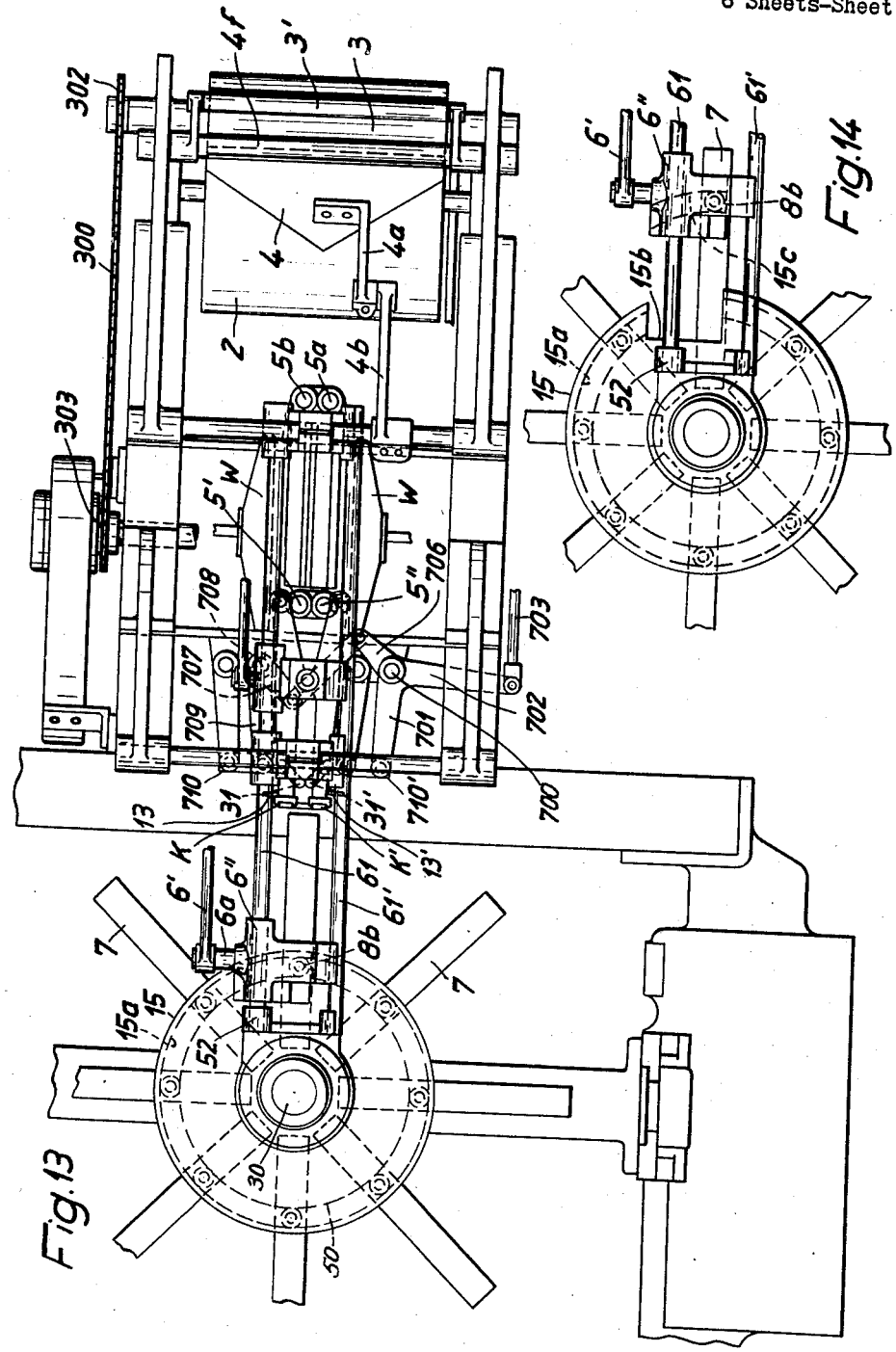

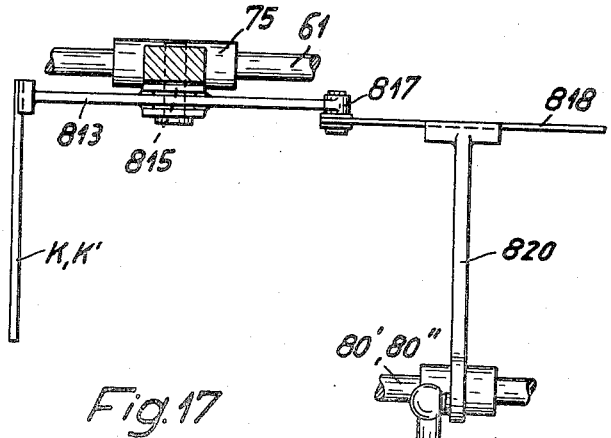
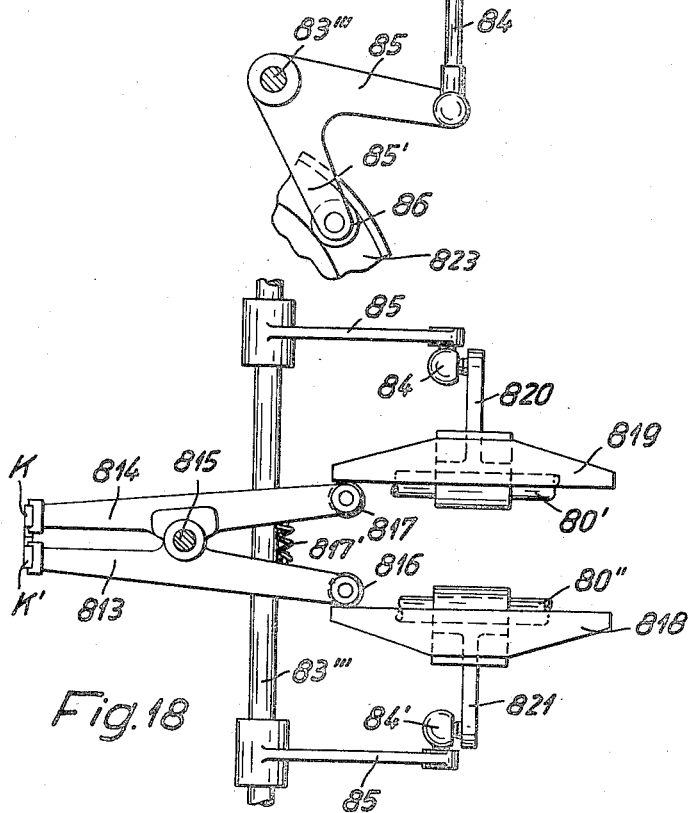

United States Patent Office 2,854,899
Patented Oct. 7, 1958

2,854,899

APPARATUS FOR MANUFACTURING HEAT-SEALED FLAT BAGS AND FOR PULLING SUCH BAGS OVER MANDRELS OF SQUARE SECTION

Ulrich Bauder, Stuttgart, and Maximilian Hornsteiner, Stuttgart-Bad Cannstatt, Germany, assignors to Firma Fr. Hesser, Maschinenfabrik-Aktiengesellschaft, Stuttgart-Bad Cannstatt, Germany, a corporation of Germany Application April 16, 1956, Serial No. 579,125

Claims priority, application Germany, April 15, 1955

2 Claims. (Cl. 93—8)

The present invention relates to apparatus for manufacturing flat bags and for pulling such bags over quadrangular folding mandrels of machines of known type which are used for manufacturing bags of rectangular or square cross section. The bags are made from a heat-sealable material such as wax paper, cellophane and other plastics, or from paper having a thermoplastic coating. The bag may as such be used for packing bulk goods of any kind. It may, however, also be used as an inner bag or lining in packages consisting of an inner and an outer bag, or of an inner bag and an outer folding box.

It is known to manufacture bags by the heat-sealing process from a flat tube of wax paper or other suitable material, a continuous sheet of such material being drawn over a shovel-like folding member by which the sheet is folded along its longitudinal middle line into two superimposed halves, and the continuous sheet being subsequently fed to a heat-sealing device by means of which the two halves of the sheet are bonded together at their free marginal portions.

It is an object of the present invention to provide apparatus suitable for pulling a flat bag having heat-sealed longitudinal and transverse bottom seams, over an angular folding mandrel in a simple and reliable manner.

It is another object of the invention to provide apparatus suitable for making such a flat bag from a flat tube, and to feed said flat bag to the device which serves to pull the flat bag over the angular folding mandrel.

Additional objects and features of the invention will become apparent from the following description in which the invention is described in connection with specific embodiments given by way of example only, and with reference to the accompanying drawings in which Fig. 1 is a diagrammatic view in side elevation of the apparatus according to the invention;

Figs. 2 and 3 are diagrammatic partial views corresponding to Fig. 1 and showing two steps of the feed of the flat tube;

Fig. 4 is a fragmentary plan view of Fig. 1 on a reduced scale and with several parts omitted;

Fig. 5 is a plan view of Fig. 1;

Fig. 6 is a view of the bottom of a bag, after the latter has been pulled over a folding mandrel;

Fig. 7 is a fragmentary side elevational view of a device for pulling the bag over the folding mandrel;

Fig. 8 is a fragmentary plan view, partially in section, of certain tongs serving to pull the bag over the folding mandrel;

Fig. 9 is a front elevational view of Fig. 8;

Fig. 10 is a side elevational view of a bag prior to the forming of the bottom thereof;

Fig. 11 is a fragmentary diagrammatic perspective view showing a phase of the bag forming process;

Fig. 12 is a side elevational view of an embodiment of the invention;

Fig. 13 is a plan view of Fig. 12;

Fig. 14 is a fragmentary side elevational view, similar to Fig. 13 but showing certain parts thereof advanced;

Fig. 17 is an enlarged fragmentary side elevational view of a device for operating the feeding tongs; and Fig. 18 is a fragmentary plan view of the device shown in Fig. 17.

Figure 15:
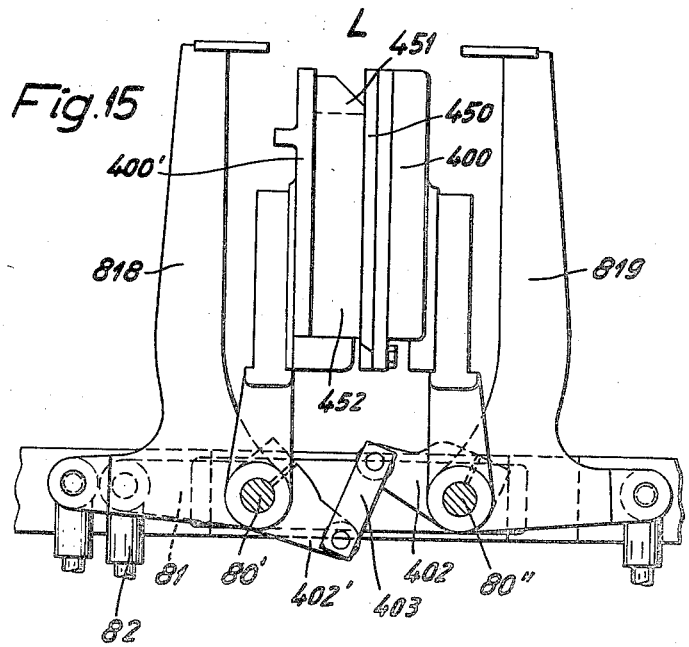
Fig. 15 is a fragmentary front elevation of certain heat-sealing tongs on an enlarged scale.

As shown in Fig. 12 of the drawings, a continuous sheet 1 used for making the flat bags, and consisting of a heat-sealable material such as wax paper, cellophane, other plastics, or paper provided with a thermoplastic coating on the inside thereof, is drawn off a rotatably mounted roll 2 by a pair of rolls 3, 3'. The roll 3 is rotated by means of a chain sprocket 302 fastened on its shaft 301, a chain 300, and a chain sprocket 303 which is secured on a shaft 60' supported in the machine frame. Fixed on the shaft 60' is a gear 305 meshing with a gear 306 secured on a shaft 60. The shaft 60 is continuously rotated in any suitable manner, as by means of an electric motor (not shown). The roll 3' is mounted so as to be freely rotatable. The continuous sheet 1 is pulled forward step by step over a freely rotatable roll 4f by feeding tongs K, K' which will be described later. Arranged behind the roll 4f, as seen in the direction of feed, is a stationary shovel-like folding member 4 which is conventional in apparatus of the kind described. The inclination of the folding member 4 can be adjusted by means of arms 4a and 4b. The arm 4a is fixed to the folding member 4 while the arm 4b is adapted to be adjustably clamped to a bracket 307' by means of a threaded bolt 307.

By means of the aforementioned feeding tongs K, K' the continuous sheet is pulled forward step by step between two pairs of vertical rolls 5a, 5b and 5', 5" arranged behind each other. During this advance movement, the continuous sheet 1 is being folded along its longitudinal middle line by the shovel-like folding member 4 in a manner which is conventional in apparatus of the kind described, so that the two lateral halves of the sheet lie flat against each other.

For compensating the variations in the tension of the continuous sheet 1 during its step-by-step advance, a transverse rod 4c is provided to which a reciprocating movement is imparted by a rod 4d. The front end of the rod 4d is articulated to an arm 4e of a double-armed lever which is supported on a pivot 71, and the other arm 10 of which carries a roller 4x in engagement with a cam affixed to shaft 60'. Due to this arrangement, the transverse rod 4c is given a movement by which the excess length of sheet 1 which has been pulled off the roll 3 is drawn tight between the rolls 3 and 4f, so that the flat tube coming off the folding member 4 will always remain taut.

Between the two pairs of rolls 5a, 5b and 5', 5", is provided a tong-like pair of jaws L for heat-sealing a longitudinal seam 1b and a transverse seam 1c in the portion of the flat tube A extending between said pairs of rolls. As shown in Fig. 15, the device L which is stationarily mounted, comprises jaws 400 and 400' which are fixedly secured on the rotatably supported pivots 80" and 80'. Likewise fixed on these pivots are arms 402 and 402' which are articulated to each other by means of a link 403. On the pivot 80' is secured an arm 81 to which is articulated a rod 82 connected with the double-armed lever 83', 83" which is pivotably mounted at 83"' (Fig 12). This double-armed lever carries a roller 84 which engages a cam affixed to shaft 60. The jaw 400' is provided with ledges 451 and 452 corresponding to the heat-sealing bands 1b and 1c of the portion of the flat tube A that has been brought between the jaws. The jaw 400 is provided with suitable ledges 450 which are heated in conventional manner by electric resistances located in the jaw 400.

Suction members 31, 31' bent in the form of a crank and adapted to be swung inwardly and outwardly with respect to the flat tube A, are provided laterally of said flat tube A (Figs. 12 and 13).

The suction members 31, 31' are formed in the shape of cranks and mounted in carriages 710, 710' which are slidable in guideways transversely of the flat tube A. The arm 701 of a three-armed lever mounted on a pivot 700 is operatively connected with the carriage 710'. The arm 702 is connected, through a link 703, with the arm 704 of a two-armed lever which is supported on pivot 71. The other arm 705 of this lever carries a roller which is in engagement with a cam fixed on the shaft 60'. Through an articulation, the arm 706 is connected with an arm 707 of a two-armed lever which is mounted on a pivot 708, and the other arm 709 of which is operatively connected with carriage 710.

Figure 16:
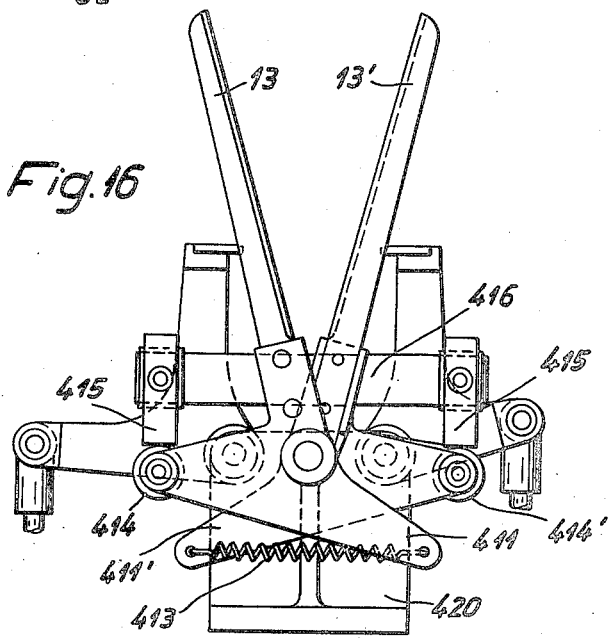
Fig. 16 is a fragmentary front elevation of certain gripping tongs on an enlarged scale.

A scissor-like cutting device 13, 13' is provided behind these suction members 31, 31'. As may be seen from Fig. 16, this cutting device comprises two knives 13, 13' pivotable relative to each other. Each knife is secured to a holder 411, 411' which in turn is pivotally mounted on a pin 412 supported in a bracket 420. The holders 411 and 411' are each provided with rolls 414, and 414' respectively which by means of a spring 413 are held in engagement with abutment members 415, 415' secured on a transverse rod 416 which is itself fixed on the machine frame in 808.

Operation of the scissors is effected by means of a rod 800 connected to a yoke 801. The yoke 801 is vertically guided by levers 802, 803 which are respectively mounted in parallel relation on pivots 804 and 805 of a bracket 806. Secured to yoke 801 is a horizontally extending flat bar 808 which carries two sliding members 808' arranged below the rollers 414 and 414', respectively. At its lower end, the rod 800 is articulated to an arm 809 of a two-armed lever which is mounted on a pin 810, and the other arm 811 of which carries a roller 812 engaging a cam carried by shaft 60'.

Reciprocating movement of the feeding tongs K, K' is effected by means of a lever 70 mounted on pivot 71 and carrying a roller 62 engaging a cam carried by shaft 60'. By means of a link 72, the lever 70 is connected with the arm 73' of a two-armed lever mounted on the pivot 430. The other arm 73" of this two-armed lever is connected at 74 to a sliding member 75 by means of an articulated link 73"'. The sliding member 75 is guided on two rods 61, 61' of the machine frame.

The jaws K and K' are fixed to two-armed levers 813 and 814 which are supported on a pivot 815 of sliding member 75 so as to be pivotable in a horizontal plane, and are provided with rollers 816 and 817. A spring 817' tends to urge the two jaws K and K' towards each other. Arranged laterally of rollers 816 and 817 are guide members 818 and 819 which are mounted on bars 820 and 821 supported on pivots 80' and 80" (see Fig. 15). Articulated to transverse extensions of levers 820 and 821 are rods 84 and 84'. Operatively connected with rod 84 is a two-armed lever 85 which is supported on pivot 83"' and the arm 85' which carries a roller 86 engaging a cam 823 fixed on shaft 60. As may be seen from Fig. 18, the same arrangement is provided for the guide member 818.

For pulling the flat bags over a folding mandrel 7 of the machine which serves to make angular bags from said flat bags, each folding mandrel 7 is provided with a pair of pulling tongs 8 (see Figs. 7 to 9). In the embodiment illustrated, the machine is equipped with a wheel 50 for making angular bags from the flat bag. Machines of this kind are well known in the art, and it is therefore sufficient to say that the wheel 50 which in the embodiment illustrated carries eight folding mandrels 7, is fixed on a vertical shaft 30 intermittently driven by suitable conventional means, for instance by a Geneva wheel mechanism.

The gripping tongs 8 of each folding mandrel 7 comprise two lateral arms 8f and 8f' on which are mounted two-armed tong levers 9 and 9a. Plates 119 and 119' are guided in longitudinal slots 7a and 7a' on each side of the folding mandrel 7. These plates have lateral recesses in engagement with the arms 8f and 8f' so that the plates 119 and 119' participate in the reciprocating movement of the tongs 8. The arms 9 and 9a which are supported on pivots 8c and 8c', are pressed against the plates 119 and 119' by means of springs 11 and 11a, and on their free ends are provided with rollers 8e and 8e'. Fixed on each pair of tongs is a pin 8g carrying a roller 8b.

A rod 6' (Figs. 12, 13 and 14) serves to impart a reciprocating movement to the tongs 8. This rod is guided in sleeve-shaped supporting brackets 76 and 76', and pivotally connected to a pin 6a of a sliding member 6" which is slidably guided on the previously mentioned horizontal rods 61 and 61' fixed to the machine frame. By means of an articulated link, the rod 6' is connected with a two-armed lever 443 mounted on the pivot 430, and is actuated by a cam carried by the shaft 60', in a manner similar to that described in connection with lever 73" and 73'.

A cam 15 having a circular groove 15a is fixedly mounted concentrically with the shaft 30 of the mandrel wheel 50. During rotation of the mandrel wheel 50, the roller 8b of each pair of tongs 8 runs in the annular groove 15a. At the point at which after every indexing movement of the wheel 50 a flat bag is pulled over a folding mandrel 7, the cam 15 is provided with a recess 15b. The sliding member 6" mentioned above is likewise provided with a groove 15c which has the same width and the same radius of curvature as the annular groove 15a of the cam 15 (see Fig. 14). Normally, the sliding member 6" is in the position shown in Fig. 14.

Guide members 830 and 831 (see Figs. 7, 8 and 9) which are secured to an arm of the two-armed levers 800 and 801, respectively are provided for opening the pulling tongs. The other arms of levers 800 and 801 are operatively connected with rods 832 and 833 which are controlled in a manner similar to that described in connection with the guide members 818 and 819. The rod 832 is articulated to one arm of a two-armed lever 834 which is supported in pivot 810, and the other arm 811 of which carries a roller 812 engaging a cam affixed to shaft 60'. The rod 833 is operated in a similar manner. When the tongs 8 are to be opened while they move into their position for pulling a flat bag over the folding mandrel, the guide members 818 and 819 are swung inwardly, thereby pressing on the rollers 8e and 8e'.

When the folding mandrel 7 reaches the position in which the flat bag is to be slipped over it, the roller 8b of its pulling tongs enters into the groove 15c of the sliding member 6". The sliding member is now pulled to the right (in Figs. 12, 13 and 14) by the rod 6', whereby the pulling tongs 8 are likewise displaced towards the right.

In order to facilitate slipping the flat tube section over the folding mandrel 7, the latter is preferably divided in the horizontal plane. In this case, the upper part is rigidly secured to the folding mandrel wheel 50, while the lower part 7h is supported on a pin 431 of wheel 50 (see Fig. 12). On the lower side of the rear end of part 7h is provided a roller 7k mounted on a pin 7i. A two-armed lever 47a and 47c mounted on a pivot 440 and provided with a plate 446 on its upper arm, is provided at the point at which the flat bag is to be drawn over the mandrel 7. Articulated to the lower arm 47c of this lever is a rod 48 which is subjected to the action of a spring 451 having the tendency to pull the rod 48 into a position in which the plate 44b of the arm 47a is not in engagement with the roller 7k. For the purpose of drawing the flat bag over the mandrel, the rod 48 is moved to the left (in Fig. 12), against the action of spring 451, by a cam secured on the shaft 60, whereby the arm 47a, through the interaction of plate 44b and roller 7i, swings the lower part 7h of the folding mandrel upwards, so that the cross sectional diameter of the folding mandrel is reduced.

The mode of operation of the apparatus according to the invention will now be described with reference to Figs. 1 to 5. As illustrated in Fig. 1, the end portion of the flat tube A, which in the previous operation has been provided with the longitudinal seam 1b and the transverse seam 1c, projects beyond the pair of rolls 5a, 5b.

At the beginning of each operating cycle, the feeding tongs K, K' grip the flat tube 1 on the heat-sealed seam 1c, at the point indicated at I in Fig. 1, and the feeding tongs K, K' are advanced to the position shown in Fig. 1. The suction members 31, 31' are then swung inwardly into engagement with the flat tube A, whereupon suction is applied and the suction members are swung outwards by an amount corresponding to the width of folding mandrel 7. The sliding mandrel 6" is in the position shown in Fig. 14, in which it engages in the recess 15b of cam 15. After the suction members 31 and 31' have been swung outwards, the tongs 8, in open position, are advanced by member 6"', and are then closed about the slide walls of the front end of the tube A which is being held open by the suction members 31 and 31'. Opening and closing of the tongs 8 is controlled by the guide members. The suction members 31 and 31' are now disconnected from their source of suction, and the tongs 8 as well as the feeding tongs K, K' moved past the position shown in Fig. 2, into the position of Fig. 3, whereby the end of flat tube A is drawn over the folding mandrel 7. Before the end of the tube has been pulled over the folding mandrel 7, the cross section of the latter has been reduced by the device previously described. The movements of the pulling tongs 8 and of the feeding tongs K, K' are controlled by the above described associated cams and linkages in such a manner that the pulling tongs 8 and the feeding tongs K, K' execute at first similar movements which then become progressively dissimilar, the pulling tongs 8 being moved more slowly, and the feeding tongs K, K' more quickly. By these movements of the feeding tongs K, K' and of the pulling tongs 8, the end of the flat tube is kept taut while it is being drawn over the mandrel. After the end of the tube has been completely pulled onto the mandrel, it is cut off close behind the gripping tongs K, K' by the scissors 13, 13'. The cut-off tube section projects now beyond the folding mandrel only with the heat-sealed rear transverse seam 1c, as shown in Fig. 10. After the feeding tongs K, K' have reached the position shown in Fig. 3, the jaws 400, 400' of the heat-sealing device L are brought into contact with the tube section which has been drawn through the pairs of rolls 5', 5" and 5a, 5b by the advance movement of the gripping tongs K, K', whereupon the longtudinal seam 1b and the transverse seam 1c of the tube section are being heat-sealed. In the meantime, the feeding tongs K, K' have been moved back to the transverse seam 1c of the tube section A which projects beyond the pair of rollers 5a, 5b, whereupon the above described operating cycle is repeated.

If desired, the drawing of the tube over the folding mandrel may be favoured by ledges 14, 14' which are movable and adjustable with respect to the mandrel, the ledge 14 folding the longitudinal seam 1b against the mandrel. After the tube section has been drawn over the folding mandrel, the folding mandrel wheel 50 is rotated by one step. Thereby the roller 8b of the pulling tongs 8 disengages from the groove 15c of the slider 6" and enters into the annular groove 15a of the cam 15 in which it remains during the further rotation of the mandrel wheel until the associated folding mandrel comes again into the position for pulling on a new tube section.

The folding of the transverse seam 1c against the face of the folding mandrel, and the further forming of the bag bottom, are accomplished during rotation of the folding mandrel wheel in a manner and by means well known to those skilled in the art, and are not an object of the invention or of the following claims.

What is claimed is:

1. In an apparatus for forming heat-sealed bags including means for forming a continuous flat tube having longitudinally spaced transversely extending bottom seams, the provision of a mandrel, longitudinally reciprocable feeding tongs at either side of said tube for intermittently moving said tube toward said mandrel, a suction member at either side of said tube adjacent to said mandrel for opening the forward end of said tube whereby it may encompass said mandrel on further movement toward the same, a pair of pulling tongs each reciprocably mounted upon an opposite side of said mandrel for pulling said tube upon said mandrel, a cutting device mounted between said suction members and said mandrel and operable to cut said tube adjacent each transverse seam upon each cycle of operation of the apparatus, means in each cycle of operation for first moving said feeding tongs and said pulling tongs toward said mandrel at the same rate of speed whereby said tube is maintained in a taut condition, and means in each cycle of operation for subsequently moving said feeding tongs toward said mandrel at a greater speed than that of said pulling tongs whereby an additional portion of said tube for forming a bag bottom is moved to said mandrel.

2. An apparatus as defined in claim 1 wherein said pulling tongs comprises a pair of plates longitudinally slidable in either side of said mandrel, an arm extending laterally from each plate, a tong member centrally and pivotally connected to each arm, a spring interconnecting the rear end of each tong member and the outer end of its associated arm whereby the forward end of each tong member is urged into engagement with its associated plate, a roller carried at the rearward end of each tong member, and a pair of guide members adapted to contact said rollers whereby to open said tongs.

References Cited in the file of this patent

UNITED STATES PATENTS

| | | |
|---|---|---|
| 2,326,931 | Dalton | Aug. 17, 1943 |
| 2,346,191 | Schultz et al. | Apr. 11, 1944 |
| 2,577,386 | Vergobbi | Dec. 4, 1951 |
| 2,698,046 | Finke | Dec. 28, 1954 |